United States Patent [19]

Lohr et al.

[11] 4,029,961

[45] June 14, 1977

[54] APPARATUS FOR MEASURING THE NUCLEAR RADIATION OF A SEQUENCE OF RADIOACTIVE SAMPLES

[76] Inventors: Wilhelm Lohr, Reichertsklinge 11, D-7547 Wildbad; Fritz Berthold, Engelsbrander Strasse 12, D-754 Neuenburg, both of Germany; Robert W. Allington, 1551 Ridgeway Road, Lincoln, Nebr. 68522

[22] Filed: Apr. 11, 1975

[21] Appl. No.: 567,436

[52] U.S. Cl. .................................. 250/328
[51] Int. Cl.² ..................................... G01T 1/00
[58] Field of Search .............. 250/328; 141/130; 198/131, 179

[56] References Cited

UNITED STATES PATENTS

| | | | |
|---|---|---|---|
| 3,418,084 | 12/1968 | Allington | 141/130 X |
| 3,553,454 | 1/1971 | Olson et al. | 250/328 |
| 3,859,528 | 1/1975 | Luitwieler, Jr. et al. | 250/328 |
| 3,895,660 | 7/1975 | French et al. | 198/131 X |

*Primary Examiner*—Davis L. Willis
*Attorney, Agent, or Firm*—Vincent L. Carney

[57] ABSTRACT

To measure the nuclear radiation of a sequence of radioactive samples, magazines that hold sample containers are removably positioned in shuttles, some of which are driven step-by-step by a toothed belt that engages racks on the sides of the shuttles from one compartment to another through a measuring station, with the shuttles that are being driven by the belt driving other shuttles not in engagement with the belt at that time. In the measuring station, the sample containers are released from the magazines one at a time through openings in their bottoms and lowered by a reciprocable support to a position adjacent to a radiation detector for the measurement, after which they are raised by the support to the magazine and the shuttle is driven one more step to the next position.

26 Claims, 8 Drawing Figures

APPARATUS FOR MEASURING THE NUCLEAR RADIATION OF A SEQUENCE OF RADIOACTIVE SAMPLES

This invention relates to an apparatus for measuring the nuclear radiation, such as beta or gamma radiation, of a sequence of radioactive samples loaded in assigned sample containers, which may be test tubes.

In one class of radiation measuring apparatus sample containers are conveyed automatically or semi-automatically to a measuring station for measuring the nuclear radiation. In the measuring station they are placed under a counting tube or adjacent to a scintillation crystal. In this class of apparatus the sample containers are placed individually in ring-shaped track blocks of a closed conveyor chain. The bottom parts of the sample containers slide on the surface of a worktable and are individually conveyed to a working place where the bottom part of the container rests on an elevator-type support which in a stop phase of the intermittently advancing conveyor chain lowers the sample container to a measuring place and after measurement is completed re-introduces it into the appropriate holding ring of the conveyor chain.

This class of apparatuses are advantageous because no additional installations are required on the worktable and the measuring place can be located below the worktable so that the sample containers are freely accessible on top of the worktable. However, the disadvantage of this class of apparatus is that the sample containers must be placed individually into the conveyor chain before measurement and individually removed after measurement. This complicates presorting of the sample containers by groups and makes continuous automatic operation of the device difficult.

To avoid these disadvantages, one type of prior art apparatus includes sample containers positioned in groups in magazines, with a different magazine provided for each group, the magazines being moved horizontally by a transporting means which advance the sample containers inserted in the magazines step-by-step to the working place. The magazines have a substantially closed bottom so that for measuring the sample at the working place the sample container must be elevated by a grip or similar transfer means to the measuring place of the measuring station which is located above the working place.

The advantage of this prior art type of apparatus is that larger groups of the presorted sample containers may be rapidly placed on, and removed from, the transporting means, thus ensuring convenient continuous operation of the device. However, the disadvantage is that the measuring place is provided above the working place, taking up space required for other purposes, such as manual or manipulator operations on the containers, or space for accessory equipment such as index controls for the transporting means.

Accordingly it is an object of this invention to provide a novel apparatus for measuring nuclear radiation.

Based on a device of the aforementioned type wherein groups of sample containers are inserted in magazines it is provided that each sample container comprises positively opening and closing receiving means for each sample container of a group of containers to be inserted in the magazines. Furthermore a control means is provided to open each receiving means at the working place, and the measuring place of the measuring station is disposed below the working place.

Each receiving means of the apparatus according to this invention may be provided with a positively engaging holding means which cooperates with a matching, such a complementary, portion of the sample container or which simply engages below an enlarged upper lip of the sample container. However, preferably each receiving means is provided with a holding means frictionally engaging the respective sample container. Surprisingly, it has been found that this ensures a reliable operation of the apparatus and, moreover, jamming on insertion of the sample containers in the holding means and on lowering the sample container from the holding means and re-insertion may be reliably avoided.

In one embodiment, the transporting means operates along an open transfer path between the points of insertion and removal of the magazines. In this embodiment, the magazines are placed on the transporting means at one end of the transfer path and removed at the other end of the transfer path after the nuclear radiation of the samples has been measured.

In another embodiment, the transporting means operates along a closed transfer path and, if desired, the point of insertion of loaded magazines and the point of removal of measured magazines are identical.

As in the known devices comprising conveyor chains, the bottom parts of the sample containers in the magazines conveyed by the transporting means are supported on a gliding surface which brings the sample containers in the desired position at the working place. At the working place a sample container is passed by the gliding surface directly onto a supporting means which is displaceable downwardly and upwardly between the working place and the measuring place with the supporting means and the gliding surface being aligned. The gliding surface may form a direct or indirect continuation of a supporting surface on which the bottom part of the sample container is brought to abut from the top at a point where the sample container is inserted in a magazine accommodated on the transporting means. The supporting surface and/or the gliding surface are conveniently provided above the worktable and the measuring station below the worktable.

As an alternative to the gliding surface it may be provided that at least adjacent to the working place in the direction the magazines are moved and before they reach the working place the bottom parts of the sample containers inserted in the magazines moved by the transporting means are freely suspended and positioned over the downwardly and upwardly displaceable elevator or supporting means so that it may be moved between the working place and the measuring place and brought back into a freely suspended position in the magazines when the supporting means of the transfer means is raised to its upper position at the working place.

The magazines of the apparatus according to this invention can be placed on shuttles connected to the transporting means which leave a free space at least below each sample container.

As a modification of a known arrangement of a device for the stepwise transportation of a number of sample containers inserted in groups in shuttles as described in U.S. Pat. No. 3,418,084 issued Dec. 24, 1968, the shuttles may be provided with lateral toothed racks in meshing engagement with advance pinions or an advance toothed belt.

The sample containers may be kept in frictional engagement in that the holding means embraces the circumference of the container by press fit so that on axial pressure the sample container is vertically displaceable through the holding means, such as by surmounting the frictional forces of a resilient lining of a holding cylinder or holding ring. However, in the preferred embodiment at least part of the holding means in the receiving means is laterally pivotable.

In the preferred embodiment, it is sufficient if a pivotable part of the holding means engages a stationary part of the sample container. Preferably, however, two clamp-engaging parts are spread simultaneously. The pivotable part or the two parts spreadable in opposite directions may be biased in stop position by a separate spring such as a metallic pressure spring. Advantageously, the elasticity of the material from which the receiving means is made is used for biasing. It has surprisingly been found that effective operation is ensured if the magazines as well as the holding means are made from a suitable plastic material, such as by injection molding, of acetal resin, polyethylene, nylon, polyurethane, preferably admixed with granular of fiber glass. The wall thickness of the receiving means for the sample containers should be such that the holding means formed therein has the desired resiliency to allow a pivoting or a spreading movement.

The invention may best be understood by reference to two embodiments and the accompanying schematic drawings described in the following.

Figure 1:
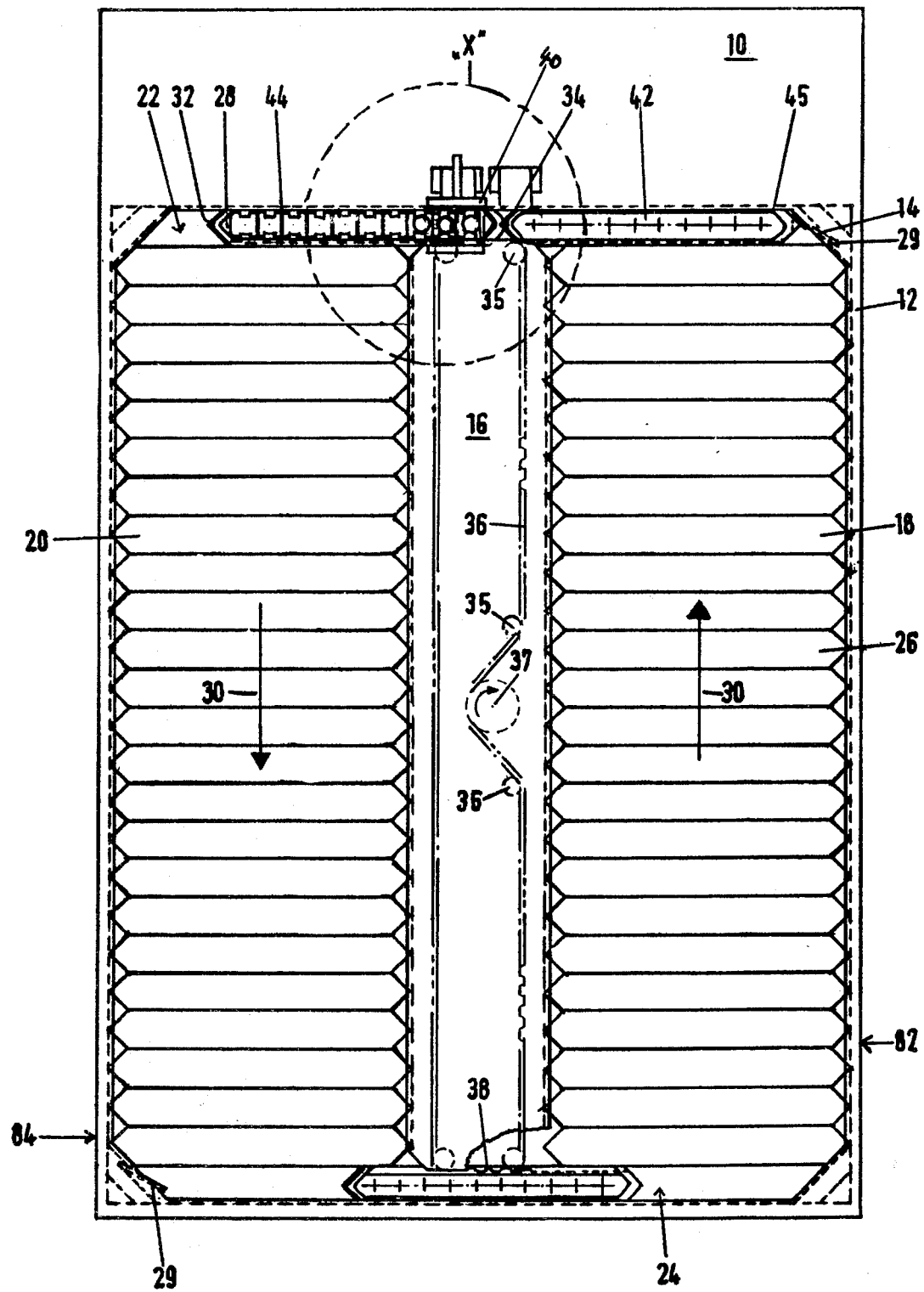
FIG. 1 is a simplified top view of an apparatus according to the invention, elements not essential to describing the invention not being shown, the area of a device as shown in FIG. 2 being marked with X.
Figure 2:
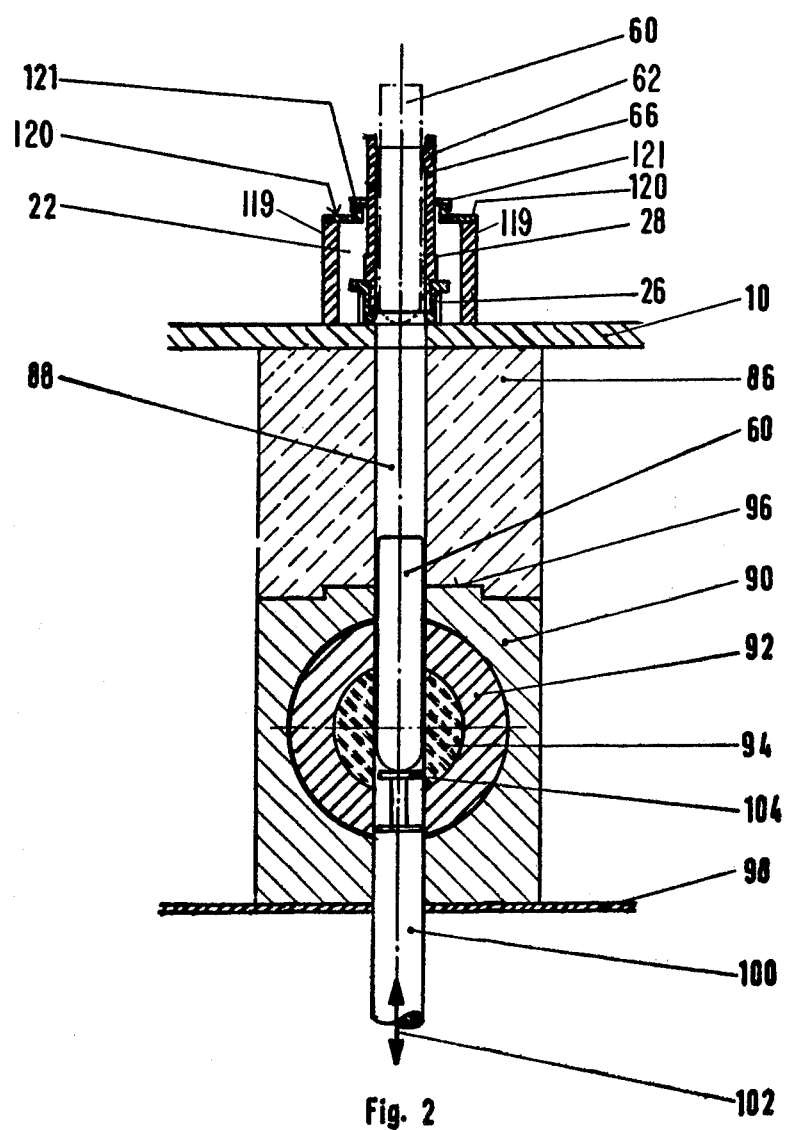
FIG. 2 is a sectional vertical view of the apparatus according to the invention which is in the area working place marked X in FIG. 1.

In FIG. 1 there is shown a transporting plate 10 forming the top of the worktable shown in FIG. 2. On the top surface of the transporting plate 10 a frame 12 is provided having the shape of an elongated rectangle with vertical inner walls forming at their corners oblique vertical connecting walls 14 inclined at an angle of 45°.

A central column or block or casing 16 extends symmetrically to the longitudinal middle line of the rectangular frame 12, which is provided with longitudinal sides extending parallel to the longitudinal sides of the frame and narrow sides extending parallel to the narrow sides of the frame, and which is likewise inclined at its corners at an angle of 45° parallel to the oblique connecting walls 14.

The frame 12 and the central column 16 form two spaced chambers 18 and 20 with parallel walls, which are connected at their ends by a transverse conveyer duct or channel 22, 24.

The chambers 18 and 20 and the transverse conveyer ducts 22 and 24 form a closed transport path for shuttles 26 along a rectangle with corners truncated at an angle of 45° and the shuttles 26 constantly circulate stepwise along this closed transport path. On each shuttle 26, there is removably mounted a magazine 28 for accommodating sample containers 60 (FIG. 2). The shuttles remain in the apparatus so that even if the shuttles 26 are incompletely loaded continuous operation is ensured, e.g. by removing magzines with measured samples from the shuttles after "X" and inserting magazines with unmeasured samples in a section of the transport path before X. "After" and "before" refer to the direction of transport of the shuttles 26 indicated by arrows 30, which circulate from the chamber 18 into the transverse conveyer duct 22 with area X, then into the chamber 20 and from there through the transverse conveyer duct 24 back into the chamber 18. The numeral 82 marks a point of insertion and 84 a point of removal of the magazines from the shuttles 26.

As shown in FIG. 1 the shuttles 26 are closely packed in the two chambers 18 and 20 with abutting longitudinal sides in transverse direction to the length of the chambers and are guided between the frame 12 and the column 16. In the transverse conveyer ducts or channels 22 and 24 a shuttle 26 can be individually passed from one chamber to the other. Only one shuttle 26 is passed from one chamber to the other with its axis in alignment with the axis of the transverse conveyer channel. The shuttle 26 is guided in the transverse conveyer channel with its lateral surfaces.

At both ends, the shuttles 26 have an oblique point inclined at both sides at an angle of 45°, one side being slightly longer than the other so that at one end of the shuttle the point is staggered to one side with respect to the longitudinal middle line of the shuttle and at the other end of the shuttle it is staggered to the other side. The longer side is oriented at the side of the frame 12 in transport direction 30 and at the side of the central column 16 opposite transport direction 30. With this structure, the shuttles 26 are conveniently moved from one end of a chamber to the transverse conveyer channel or duct and from there to the other chamber along the connecting walls 14 of the frame 12 and along the parallel oblique sides of the central column 16. The movement of the shuttles is promoted by a leaf spring 29 connected with one end to the connecting wall 14 and pointing with its free end into the direction of transport 30, covering the central area of the connecting wall 14.

At the ends of the shuttles 26, complementary coupling members in the shape of an upwardly pointing hook 32 and a downwardly pointing hook 34 are provided, which engage behind each other with undercut flat back surfaces so that a shuttle 26 forced into a transverse conveyer duct pulls the following shuttle into the transverse conveyer duct. In the transverse conveyer duct each of the shuttles are driven by means of a tooth belt 36 disposed laterally in the column 16, and engaging the tooth racks 38 which are provided on both sides of each shuttle 26. As an alternative, pinions may be provided. If desired, the driving means may also be provided in the frame 12.

The toothed belt 36 travels over pulleys 35, at least one of them being utilizable as tensioning pulley, which pulleys are intermittently driven by drive gear 37 such that one sample container each is stepwise positioned at the working place 40. The driving unit of drive gear 37 is conventional and may be located like the other parts of the driving means in the column 16.

The closed transport path may also be quadrangular or in the form of an elongated rectangle such that the working place is located at one long side of the rectangle in a transverse conveyer channel.

The shuttles 26 form a receiving container with an open bottom 42, the opening being formed of a supporting rim 44 which forms the remaining bottom part on which the magazines 28 are placed when inserted in the shuttles 26. The magazines are positively held in the walls 45 of the shuttles by engaging walls and have complementary bottom contours. Instead of a completely open bottom, the bottom may include a different hole under each sample container, larger in diameter than the sample container.

With the exception of the open construction of the bottom 42 of the suttles, the location of the toothed rack 38 laterally at the shuttles and not below the shuttles and the mounting of the driving means 36 at the sides of the shuttles and not below the shuttles, the described device corresponds to the automatically operating device for the stepwise transportation of a number of shuttles described in U.S. Pat. No. 3,418,084 issued Dec. 24, 1968, to which reference is made in this connection.

Figure 3:
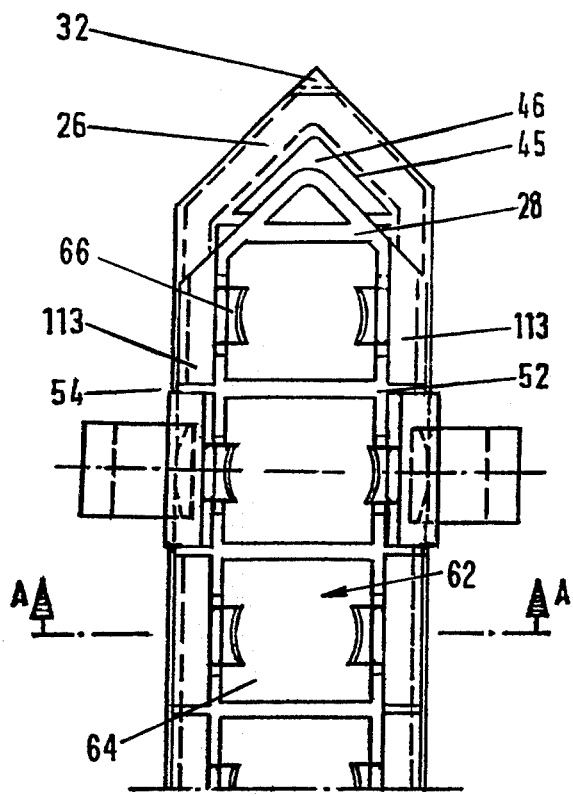
FIGS. 3 and 4 are detailed sectional top views of portions of area X of FIG. 1, FIG. 3 showing a magazine at the working place, with the holding means being spread and FIG. 4 showing a magazine as it approaches the working place, with the holding means not being spread.
Figure 4:
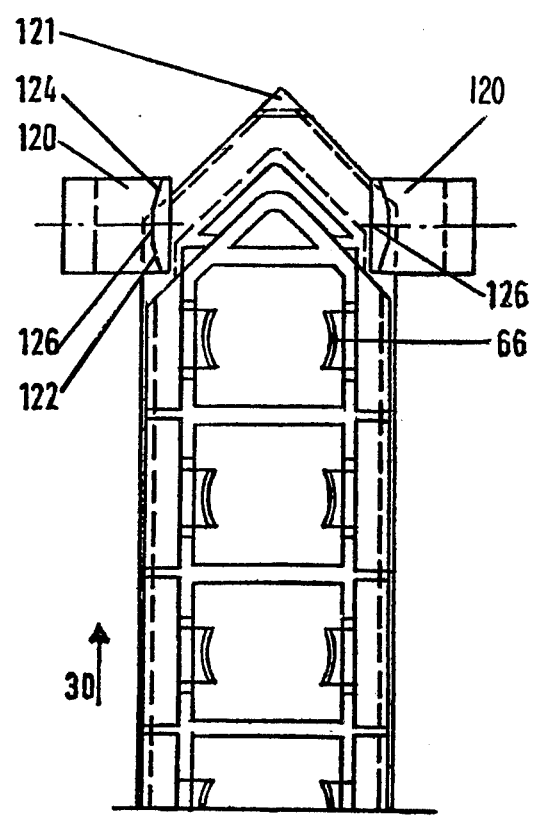
Figure 5:
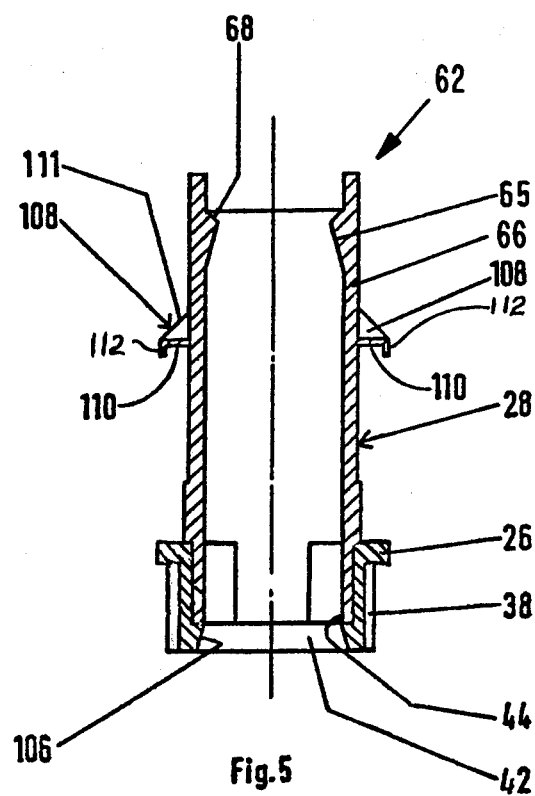
FIG. 5 is a sectional vertical view along line A—A of FIG. 3.

FIGS. 2 to 5 and FIGS. 6 to 8 show two alternative types of magazines 28 which are individually insertable in shuttle 26. According to both embodiments, magazine 28 has a skeleton type magazine body 52 the bottom contour 46 of which in the first embodiment shown in FIGS. 3 to 5 is substantially complementary to the inside shape of the walls 45 of the shuttle 26. As in the embodiment shown in FIGS. 6 to 8, a base member 48 is formed complementary to the inside wall 45 of the shuttle 26 and a top part 50 projects at the top of the shuttle 26 with a bottom section 52 supported on the upper edge of the channel.

The magazine 28 of the first embodiment shown in FIGS. 2 to 5 is made from a suitable plastic material, whose elasticity is enhanced by admixtures of granular of fiber glass, e.g. an acetal resin, nylon, polyethylene or polyurethane prepared in one piece by injection molding. The magazine 28 of the second embodiment shown in FIGS. 6 to 8 may also be made from a plastic material, optionally from the same kinds of plastic. However, in particular this second embodiment may also be made from other materials, e.g. a metal. If the magazine of the first embodiment is made from a metal this should be a resilient metal for reasons explained further below.

In the first embodiment shown in FIGS. 2 to 5 the skeleton type magazine body 52 is reinforced by transverse walls 54, spaced apart and following one after the other in the longitudinal direction of the magazine 28.

As part of the magazine body 52 several receiving means 62 open at top and bottom are provided in equal distances in the longitudinal direction of the magazine, which are regularly spaced in series and accommodate each a test tube sample container 60. Each receiving means 62 has a quadrangular, round or otherwise shaped bottom part 64 formed by the surface of the skeleton type magazine body 52 and its transverse walls 54. At the outer wall of the magazine body a pair of opposed tongues 66 are formed by grooves made on both sides, which upwardly extend the receiving means 62 and inwardly form clamps 65 engaging at the circumference of the sample container 60.

The clamps 65 in this embodiment are designed as ramp-shaped projections (FIG. 5). The tongues 66 are circularly shaped (FIGS. 3 and 4). Each tongue extends over a radial angle such as 60°, or more generally about 45° to 70°. The tongues 66 are disposed diametrically so that the tangent at the center of the tongue runs parallel to the axis of the magazine 28. In the upper end of the tongues 66, slightly set off downwardly, straight or rounded inclined surfaces 68 are provided extending outwardly and facilitating the insertion of the sample container 60 each into the receiving means 62 from above by forming a funnel. The material from which the magazines 28 as well as the receiving means 62 are made and the wall thickness of the tongues 66 should be such that the two tongues form a holding means being resilient in the radial direction, which holding means frictionally receives the inserted sample container. Alternatively, there may be a positive connection by providing the tongues with internal projections which engage below a rim at the sample container 60, or the two parts may be connected through engagement of a projection with a complementary recess.

In the above-described embodiment the receiving means 62 form an integral part of the walls of the magazines 28 and the tongues 66 form two diametrically opposed spreadable one-armed levers which are pivoted at the magazine body 52 and are biased by the spring tension inherent to the material of the magazine 28 either in frictional or in positive engagement with the inserted sample container 60.

For heavy-duty purposes, the magazines 28, the receiving means 62 and the tongues 66 forming the holding means should be of a substantially fatigue-proof plastic material. Alternatively, the holding means may be of a rigid material, as is shown in the second embodiment of FIGS. 6 to 8. This embodiment also provides for a bottom part 64 of the receiving means 62, as the embodiment shown in FIGS. 2 to 5, which embraces an inserted sample container 60 such that under the force of gravity the sample container may pass vertically downward. Four tongues 70, 72 extend upwardly from the bottom part 64 and are provided at their upper ends with an internally inclined surface 68.

Tongues 70, 72 are also circularly bent and each extend over a radial angle of about 45° to 70°. Their center axis is arranged at an angle of 45° with respect to the longitudinal axis of the magazine. The arrangement is such that first tongues 70 are provided on one side of the magazine and second tongues on the other side of the magazine. Tongues 70 are rigid upwardly extending supports of the bottom part 64 of the receiving means 62, the two adjacent receiving means 62 shown in FIG. 7 may even form columns, each receiving means being provided with one of supporting surfaces 74 and 76.

The tongues 72 are two-armed levers radially pivotable fron a hinge 78 against a pressure spring 80 provided at the bottom part 64 of the receiving means 62. In this embodiment the pressure spring 80 provides for the engaging force of the lever tongue 72 at the inserted sample container backwardly supported by stationary support tongues 70. Here, too, the inside cross-section between the tongues 70 and 72 at least at the upper ends must be smaller than that of the bottom part 64 to cause frictional engagement or, alternatively, positive engagement with the inserted sample container, however, making sure in the latter case that the complementary part of the sample container permitting positive engagement may freely pass through the receiving means 62 on release of the engagement.

In case of positive engagement a rim or flange projection at the circumferences of the sample container need be provided. The sample container however, alternatively, may simply have a groove or some other recess facilitating its passing through the receiving means. The possibilities of positive engagement are self-evident to the expert and need not be described in detail.

Sample containers 60 initially contain unmeasured samples. Several sample containers 60 are placed in the receiving means 62 of a magazine 28. At a point of insertion the magazines 28 (FIG. 1) are then placed on a shuttle 26 and gradually conveyed in the chamber 18 to the transverse conveyer channel or duct 22 by way of the transporting means. On insertion and transportation the bottom parts of the sample containers may be at a distance above the transporting plate 10. Preferably, however, the surface of the transporting plate 10 is used for aligning the sample containers in the receiving means 62 of the magazines by allowing the sample containers to slidingly move along at least part of the transport path. The sample containers are thus slidingly transported from the working place 40 on the transporting plate 10 to a point of removal 84. Between the point of removal 84 and the point of insertion 82 the shuttles idle, without carrying any magazines 28.

In the following the operation in the area of the working place 40, marked X in FIG. 1, will be explained and some further constructional designs of the magazines which are functionally correlated will be illustrated.

As shown in FIG. 2 the transporting plate 10 covers a lead shield 86 of the worktable. After a sample container transported in a magazine (FIG. 1) has reached the working place 40 (FIG. 1) its axis is in vertical alignment with a vertical channel 88 disposed below the sample container 60. The latter channel starts below the working place 40 in the transporting plate 10 and diametrically extends through the lead shield 86 downwardly through a locking block 90, a cylindrical copper sleeve 92 encased therein and a scintillation crystal 94 mounted within the sleeve 92.

The locking block 90 is detachably held by a circular projection 96 in a related opening at the bottom surface of the lead sield 86. At the bottom surface of the locking block a casing wall 98 (not continued in the drawing) of the scintillation measuring chamber is provided. The channel 88 extends through the wall 98 of the casing.

Through this opening a piston 100 extends from below, which is vertically displaceable between two positions by a conventional driving means symbolically indicated by the double arrow 102, the two positions being defined as the dotted-line upper position of the sample container 60 and the straight-line lower position of the sample container 60. In the upper and the lower operating positions and on transfer the sample container 60 rests with its rounded bottom part on flat support 104 which is made of shielding material similar to the copper shield 92 and is attached to the upper end of the piston 100. In this manner a means for transfer of the sample container 60 from the dotted-line upper operational position at the working place to the straight-line lower position and back into the upper position is formed. The lower position corresponds to the positioning of the sample container 60 at the measuring place of the measuring station equipped with the measuring scintillation crystal (e.g. an NaI crystal) which is conventionally connected to a scintillation measuring device.

Along the transport path between the upper and the lower operational position the inside wall of the channel 88 forms a lateral guidance for the sample container 60. Reinsertion of the sample container into the receiving means after it has returned from its lower to the upper operational position is facilitated by a straight-lined or rounded slope 106 (FIG. 5) at the bottom part of the receiving means 62 aligned with respect to the channel 88 at the working place.

The inside diameter of the channel 88 must be such that the sample container is sufficiently guided and no jamming occurs during downward and upward displacement between the working place and the measuring place.

At the working place 40 and in its adjacent area X a control means is operative which releases the frictional or positive engagement of the receiving means 62 with a sample container 60 at the working place and ensures that this is initiated shortly before the sample container is conveyed to the working place and that the release is discontinued when the sample container leaves the working place.

This control is achieved by means of a cam means, the cam follower being disposed in an area somewhat below or at the upper ends of the tongues 66 of the receiving means 62. In the embodiment shown in FIGS. 3 to 5 the cam follower is formed by a hook 108 projecting from each tongue 66. This hook 108 has a first horizontal strap 110 reinforced by a vertical upper triangular rib 111 from which a second strap 112 projects vertically in downward direction which has at its inner surface a vertical wall and at its outer surface a rounded wall (FIG. 5). As shown in FIG. 3 each hook has a separate operating unit 113. The operating units may also be combined to form a common strip so that more than one tongue is pulled at a time.

Operatively attached to the two hooks 108 are cams in the form of two rails 119, one rail being stationarily attached to the frame 12 and the other to the central column 16.

Each of the rails 119 has a horizontal flange 120 attached to either the frame 12 or the column 16 and a vertical flange 121 projecting upwardly therefrom. Each vertical flange is provided at both ends with a flat inlet ramp 122 and a flat outlet ram 124 and is substantially straight-lined in the center piece 126.

When assuming that the bottom parts of the sample containers 60 during transportation slide on the top surface of the transporting plate 10 this top surface forms a gliding surface which is aligned with the top surface of the supporting means 104 in the upper operational position. Alternatively, such a gliding surface may align sample containers 60 freely suspended in the holding means of the receiving means 62 with the supporting means 104 at the working place, if such an alignment is desired.

In both cases the vertical flanges 121 are solidly engaged at the working place 40 and in the adjacent area X with the vertical second straps 112 at the hooks 108.

As a sample container 60 approaches the working place 40 the cam means becomes operative in the area of the inlet ramp 122 so that the two tongues 66 are spread in opposite directions. At the working place itself the central piece 126 becomes operative which completely releases the engagement of the tongues at the sample container and which enables the sample container to be lowered from the upper operational position (dotted line in FIG. 2) to the lower position at the measuring place (straight line) and, after measurement is completed, back to the upper position. During this period the stepwise advance of the shuttles by the transporting means along the closed transport path is interrupted.

After the sample container 60 has returned to the upper operational position the transporting means becomes operative again and by movement of the hook 108 at the outlet ramp 124 under the action of the spring forces the holding means formed by the tongues into engagement with the sample container. Operation is similar for each following sample container inserted in a magazine and so on for the sample containers of the next magazine.

Figure 6:
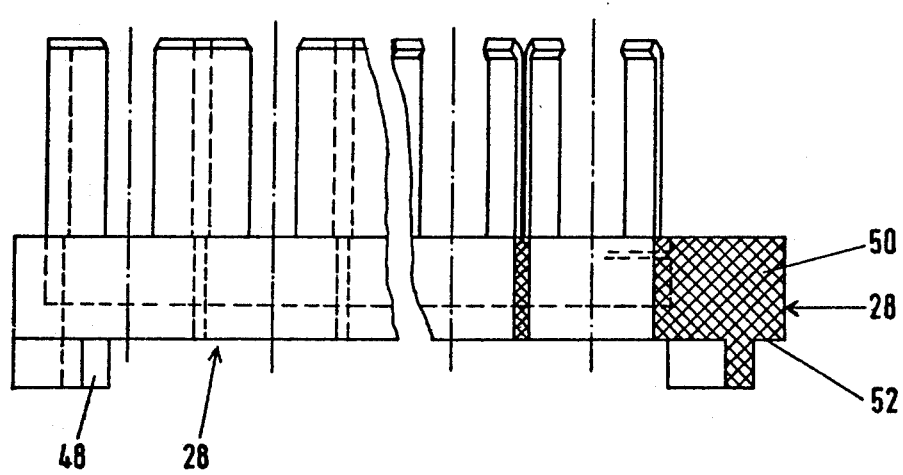
FIG. 6 is a side view of an alternative magazine of the apparatus of the invention.
Figure 7:
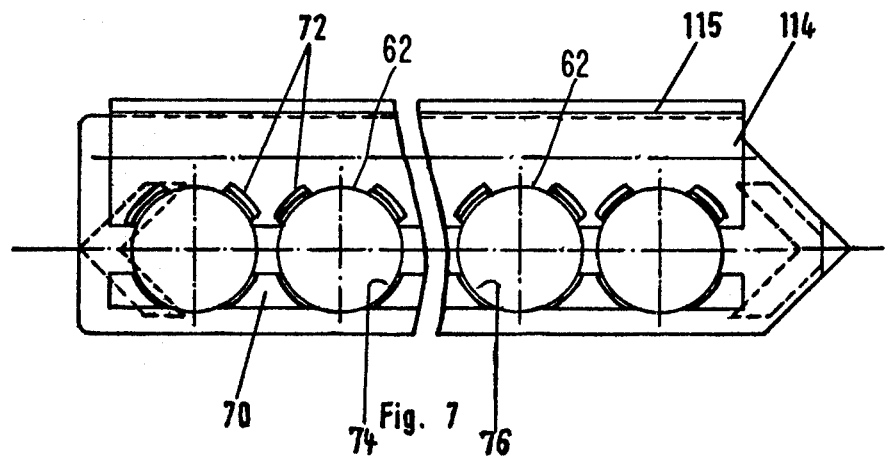
FIG. 7 is a sectional top view of a holding means of a magazine shown in FIG. 6.
Figure 8:
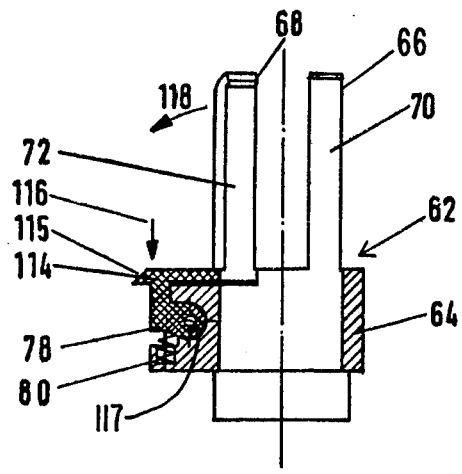
FIG. 8 is a fragmentary side view of a portion of the holding means shown in FIG. 7.

In the alternative embodiment shown in FIGS. 6 to 8 a double-armed shift lever 114 is provided instead of the hooks. This lever is provided with an abutting surface 115 inclined at an angle of 45° with respect to the horizontal line. This abutting surface cooperates with a counter-rail around the lever pivot 117 acting in the direction of the arrow 116. The tongue 72 is spread in the direction of the arrow 118 when the counter-rail acts on the shift lever 114 in the direction of the arrow 116. For the rest the operation corresponds to the above-described operation of the first embodiment.

The possibilities of operation shown in the drawings may be varied in many respects. Instead of a pressure spring a tension spring may be used. The bottom part of the receiving means 62 may be open to one side instead of being closed. Moreover, two levers could be spread in opposite directions without providing a stationary abutment at the back and without relying on the inherent elasticity of the material but by using two one-armed or multi-armed levers with separate biasing of the spring. Instead of achieving the holding of the sample containers by means of the action of a spring some other kind of controllably releasable blockage of the receiving means 62 in the closed position may be provided, such as by means of a magnet.

Finally, other types of control release means may be provided, e.g. hydraulically operating means or other types of automatic releases. By providing a suitable feeding device the sample containers may also be individually inserted in the magazines at a point of insertion from below, reinserted in the magazines, after measurement is completed, by conveying them from the measuring place to the working place, and individually removed below at a point of removal. This would ensure a continuous operation even if the magazines form an integral part of the shuttles. Also, construction elements of the embodiment of the magazine shown in FIGS. 3 to 5 could be correspondingly transferred to FIGS. 6 to 8, e.g. the upper and the lower inclined surfaces 68 and 106. Finally, the shuttles 26 and the magazines 28 may be designed as an integral constructional unit, in particular if an open transport path is provided instead of the closed transport path described above.

Although a preferred embodiment has been described with particularity, many modifications and variations in the invention are possible in the light of the above teachings. Accordingly, it is to be understood that, within the scope of the appended claims, the invention may be practiced other than as specifically described.

What is claimed is:

1. An apparatus for measuring the nuclear radiation of a sequence of radioactive samples in sample containers which are held in groups with each group held in a different magazine comprising:
    a measuring station having a working place and a measuring place;
    transporting means for moving the magazines in a horizontal direction and placing the sample containers in said magazines one-at-a-time at a working place;
    said measuring station including means for measuring the nuclear radiation in said measuring place;
    said measuring place vertically displaced below the working place;
    transfer means for conveying the sample container in a magazine at the working place to the measuring place and returning it to the magazine at the working place after the nuclear radiation of the sample in the sample container has been measured;
    each of said magazines including a receiving means for holding and releasing each individual sample container in the magazine; and
    control means for operating the receiving means to release a sample container when the sample container is at the working place 2. Apparatus according to claim 1 in which each receiving means comprises a holding means for frictionally engaging the assigned sample container.

3. Apparatus according to claim 2 in which the transfer means comprises a supporting means for supporting sample containers at the bottom part of the sample container and for moving the sample container upwardly and downwardly between the working place and the measuring place.

4. Apparatus according to claim 1 in which the transfer means comprises a guiding wall along at least one section of the transfer path between the working place and the measuring place.

5. Apparatus acccording to claim 4 further including a gliding surface on which the bottom parts of the sample containers in the magazines conveyed by the transporting means are supported.

6. Apparatus according to claim 5 in which the supporting means includes a support having an upper and a lower operational position with the support in alignment with the adjoining gliding surface when in its upper operational position at the working place.

7. Apparatus according to claim 1 including means for automatically actuating the control means in response to selected movement of the transporting means.

8. Apparatus according to claim 7 in which the receiving means comprises a cam follower and the control means comprises a stationary cam acting on the cam follower to operate the receiving means to release the individual sample container.

9. Apparatus according to claim 1 in which the receiving means comprises a laterally pivotable clamping lever.

10. Apparatus according to claim 9 in which the pivotable levers pivot in the bottom part of the magazine and engage with the upper end of a sample container inserted in the magazine.

11. Apparatus according to claim 10 in which the levers are one-armed levers.

12. Apparatus according to claim 10 in which the control means comprises a surface positioned to engage the upper end of each pivotable lever upon movement of the sample container to the working place.

13. Apparatus according to claim 12 including means for biasing the pivotable levers by spring tension against each sample container inserted in the magazine.

14. Apparatus according to claim 13 in which the pivotable levers are essentially made of a resilient plastic material.

15. Apparatus according to claim 14 in which the magazines are essentially made of plastic material.

16. Apparatus according to claim 15 in which the plastic material is nylon with admixtures of granular glass.

17. Apparatus according to claim 15 in which the plastic material is an acetal resin.

18. Apparatus acccording to claim 15 in which the plastic material is polyethylene.

19. Apparatus according to claim 15 in which the plastic material is polyurethane.

20. Apparatus according to claim 14 in which the receiving means comprises at least two levers movable to a closed position to clamp and engage the sample container.

21. Apparatus according to claim 20 in which at the upper ends the tongues are outwardly inclined or rounded.

22. Apparatus according to claim 21 in which an inner wall at or near the lower edge of the receiving means is inwardly inclined.

23. Apparatus according to claim 1 in which the receiving means comprises a stationary abutment on one side of the sample container and a pivotable lever on the opposite side of the sample container positioned to clamp the sample container between the stationary abutment and the sample container.

24. Apparatus according to claim 1 in which the receiving means comprises two spreadable parts engageable with opposite sides of the sample container inserted in the magazine.

25. Apparatus according to claim 1 in which the transfer means comprises a supporting means for supporting sample containers at the bottom part of the sample container and for moving the sample containers upwardly and downwardly between the working place and the measuring place.

26. Apparatus according to claim 25 in which the receiving means comprises two spreadable parts engageable with opposite sides of the sample container inserted in the magazine.

* * * * *

UNITED STATES PATENT AND TRADEMARK OFFICE
CERTIFICATE OF CORRECTION

PATENT NO. : 4,029,961
DATED      : June 14, 1977
INVENTOR(S) : Wilhelm Lohr, et al It is certified that error appears in the above–identified patent and that said Letters Patent are hereby corrected as shown below:

Column 1, line 41, change the word "advance" to "advances".
Column 4, line 12, change the word "magzines" to "magazines".
Column 4, line 61, change the word "tooth" to "toothed".
Column 4, line 62, change the word "tooth" to "toothed".
Column 6, line 58, change the word "fron" to "from".
Column 7, line 47, change the word "sield" to "shield".
Column 10, line 28, at the end of the line, place a period.
Column 12, line 9, change "containerand" to "container and".

Signed and Sealed this

Fourth Day of December 1979

[SEAL]

Attest:

Attesting Officer

SIDNEY A. DIAMOND

Commissioner of Patents and Trademarks